United States Patent
Campbell (10) Patent No.: US 11,524,766 B2
(45) Date of Patent: Dec. 13, 2022

(54) SINGLE MOTOR SINGLE ACTUATOR ROTORCRAFT

(71) Applicant: Bell Textron Inc., Fort Worth, TX (US)

(72) Inventor: Kip Gregory Campbell, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 324 days.

(21) Appl. No.: 16/889,608

(22) Filed: Jun. 1, 2020

(65) Prior Publication Data
US 2021/0371085 A1    Dec. 2, 2021

(51) Int. Cl.
| | |
|---|---|
| *B64C 27/50* | (2006.01) |
| *B64C 13/24* | (2006.01) |
| *B64C 11/28* | (2006.01) |
| *B64C 39/02* | (2006.01) |
| *G05D 1/10* | (2006.01) |

(52) U.S. Cl.
CPC .............. *B64C 13/24* (2013.01); *B64C 11/28* (2013.01); *B64C 27/50* (2013.01); *B64C 39/024* (2013.01); *G05D 1/101* (2013.01); *B64C 2201/024* (2013.01); *B64C 2201/108* (2013.01); *B64C 2201/16* (2013.01)

(58) Field of Classification Search
CPC ........ B64C 2201/024; B64C 2201/108; B64C 2201/16; B64C 27/50; B64C 11/28
See application file for complete search history.

(56) References Cited

U.S. PATENT DOCUMENTS

| | | | |
|---|---|---|---|
| 6,550,715 B1* | 4/2003 | Reynolds | A63H 27/12 244/17.11 |
| 7,445,536 B2* | 11/2008 | Lee | A63H 27/12 446/37 |

(Continued)

FOREIGN PATENT DOCUMENTS

| | | |
|---|---|---|
| CN | 110155316 A | 8/2019 |
| WO | 2008140851 A2 | 11/2008 |

OTHER PUBLICATIONS

Eurpoean search report in related European Patent Application Publication No. 21176695.1 dated Oct. 28, 2021, 4 pages.

(Continued)

*Primary Examiner* — Philip J Bonzell
(74) *Attorney, Agent, or Firm* — Lightfoot & Alford PLLC (57) ABSTRACT

An unmanned rotorcraft includes an airframe, rotor blades that are coupled to the airframe for rotation therewith, a propulsion unit having a propeller, and an actuator that is coupled to the airframe and adapted to temporarily reorient the propulsion unit such that an axis of the propeller moves out of alignment with an axis of the rotor blades. Rotation of the propeller causes counter-rotation of the airframe and rotor blades. The rotor blades and blades of the propeller are adapted to deploy from collapsed positions when flight of the rotorcraft is initiated. A method of operation by the rotorcraft includes, when it is determined that a current heading does not correspond to a determined flight path, causing the actuator to temporarily reorient the propulsion unit in accordance with an angular orientation of the actuator relative to the current heading.

17 Claims, 7 Drawing Sheets

(56) References Cited

U.S. PATENT DOCUMENTS

| | | | | |
|---|---|---|---|---|
| 8,251,308 B2* | 8/2012 | Choi | ................... | B64C 39/028 |
| | | | | 244/6 |
| 8,469,307 B2 | 6/2013 | Arlton et al. | | |
| 10,054,939 B1* | 8/2018 | Applewhite | ......... | G05D 1/0027 |
| 10,093,417 B2* | 10/2018 | Meringer | .............. | B64C 27/006 |
| 10,793,265 B2* | 10/2020 | Tayman | ................ | B64C 39/024 |
| 10,946,956 B2* | 3/2021 | Campbell | ............... | B64C 27/12 |
| 2013/0206915 A1 | 8/2013 | Desaulniers | | |
| 2018/0281939 A1* | 10/2018 | Tayman | .................. | B64C 27/50 |
| 2020/0070969 A1 | 3/2020 | Campbell | | |
| 2020/0231275 A1* | 7/2020 | Groman | .............. | F04D 25/0606 |

OTHER PUBLICATIONS

European exam report in related European Patent Application Publication No. 21176695.1 dated Nov. 9, 2021, 10 pages.
European exam report in related European Patent Application Publication No. 21176695.1 dated May 20, 2022, 11 pages.

* cited by examiner

SINGLE MOTOR SINGLE ACTUATOR ROTORCRAFT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The technology of Unmanned Aerial Vehicles (UAVs) and applications for their use continues to evolve at a rapid pace. For example, drones are used for aerial photography, to fill combat roles, by hobbyists, and are contemplated for use in the delivery of goods and services. However, known rotorcraft drones that are capable of hovering as well as forward flight typically have multiple rotors and can be prohibitively expensive and/or overly complicated to operate for use in certain roles.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Unmanned rotorcraft having a single motor and a propulsion unit that is reoriented via a single actuator, along with methods for such rotorcraft to maintain a flight path, are disclosed herein. Such unmanned rotorcraft may be provided with collapsible blades that are adapted to deploy when flight is initiated.

Figure 1:
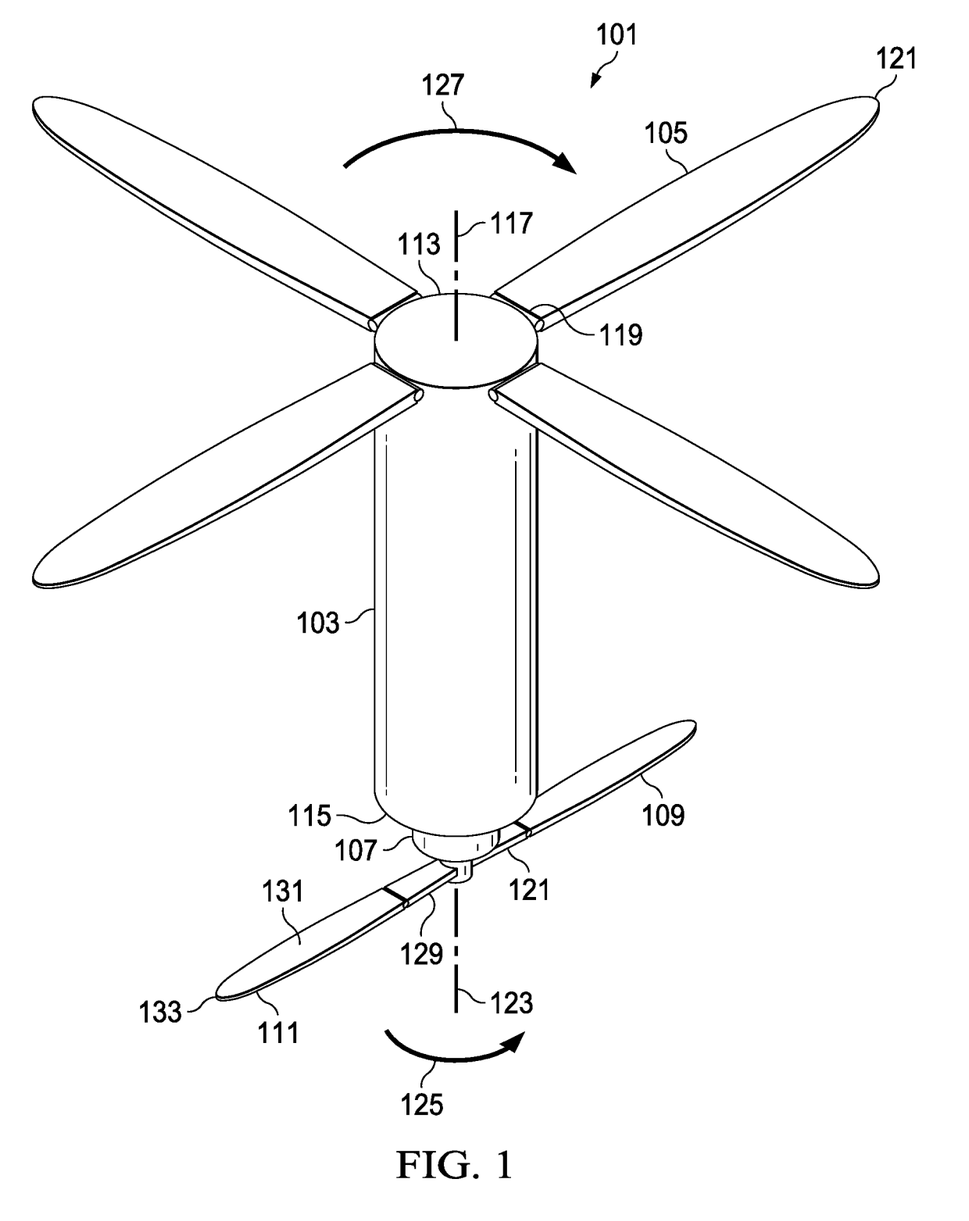
FIG. 1 is an oblique view of an unmanned rotorcraft having main rotor blades and a propulsion unit that includes a propeller.

FIG. 1 is an oblique view of an unmanned rotorcraft 101. Rotorcraft 101 comprises an airframe 103, a plurality of main rotor blades 105 that are coupled to airframe 103 for rotation therewith, and a propulsion unit 107 having a propeller 109 that includes a plurality of propeller blades 111. In this embodiment, airframe 103 has a substantially cylindrical shape that extends from a first end 113 to a second end 115. However, it should be appreciated that airframe 103 can be alternatively implemented with any other suitable geometry.

Blades 105 are coupled to airframe 103 in fixed positions for rotation therewith about a rotor axis 117. As shown, blades 105 are coupled to airframe 103 at first end 113 thereof. Each blade 105 extends from a root 119 that is coupled to airframe 103 to a tip 121. In this embodiment, blades 105 are adapted to be collapsible relative to airframe 103. More specifically, root 119 of each blade 105 is pivotally coupled to airframe 103. Blades 105 are collapsible toward airframe 103 when rotorcraft 101 is not in flight, for example by folding blades 105 toward airframe 103 such that tips 121 move inward toward airframe 103 and toward second end 115 thereof.

Rotorcraft 101 is configured such that blades 105 can be secured in respective collapsed positions relative to airframe 103 while rotorcraft 101 is not in flight, and such that blades 105 deploy from their respective collapsed positions when flight of rotorcraft 101 is initiated. As shown, rotorcraft 101 is adapted such that blades 105 deploy from their collapsed positions when flight of rotorcraft 101 is initiated and airframe 103 rotates about rotor axis 117. Preferably, blades 105 are adapted to lock into respective deployed positions after flight of rotorcraft 101 is initiated.

In a preferred implementation, blades 105 are configured in accordance with desired flight characteristics of rotorcraft 101. For example, one or more physical characteristics of blades 105, such as respective dimensions, geometry, camber, and pitch thereof, can be configured based on an expected rotation rate of airframe 103, to impart desired lift and anti-torque forces to rotorcraft 101.

As shown, propulsion unit 107 is located proximate to second end 115 of airframe 103. In this regard, blades 105 and propulsion unit 107 are located at opposed ends of airframe 103. Propulsion unit 107 includes a motor (not shown) that causes blades 111 of propeller 109 to rotate about a propeller axis 123. During flight of rotorcraft 101, rotation of propeller 109 imparts counter-rotation to airframe 103, thus causing blades 105 to rotate. For example, rotation of blades 111 in a first direction 125 about propeller axis 123 causes blades 105 to rotate in an opposed second direction 127 about rotor axis 117. It should be appreciated that first direction 125 is not limited to the illustrated counterclockwise rotation. For example, propulsion unit 107 can alternatively be adapted to cause blades 111 to rotate in second direction 127, which in turn would cause blades 105 to rotate in first direction 125.

In this embodiment, blades 111 are adapted to be at least partially collapsible relative to airframe 103. More specifically, each blade 111 has a fixed portion 129 that extends outward from a propeller shaft (not shown) of propulsion unit 107 and a collapsible portion 131 that is pivotable relative to airframe 103. Portions 131 of blades 111 are collapsible toward airframe 103 when rotorcraft 101 is not in flight, for example by folding the portions 131 toward airframe 103 such that tips 133 of blades 111 move inward toward airframe 103 and toward first end 113 thereof.

Rotorcraft 101 is configured such that portions 131 of blades 111 can be secured in respective collapsed positions relative to airframe 103 while rotorcraft 101 is not in flight, and such that portions 131 deploy from their respective collapsed positions when flight of rotorcraft 101 is initiated. As shown, rotorcraft 101 is adapted such that portions 131 deploy from their collapsed positions when flight of rotorcraft 101 is initiated and propeller 109 rotates about propeller axis 123. Preferably, portions 131 of blades 111 are adapted to lock into respective deployed positions after flight of rotorcraft 101 is initiated.

Figure 2A:
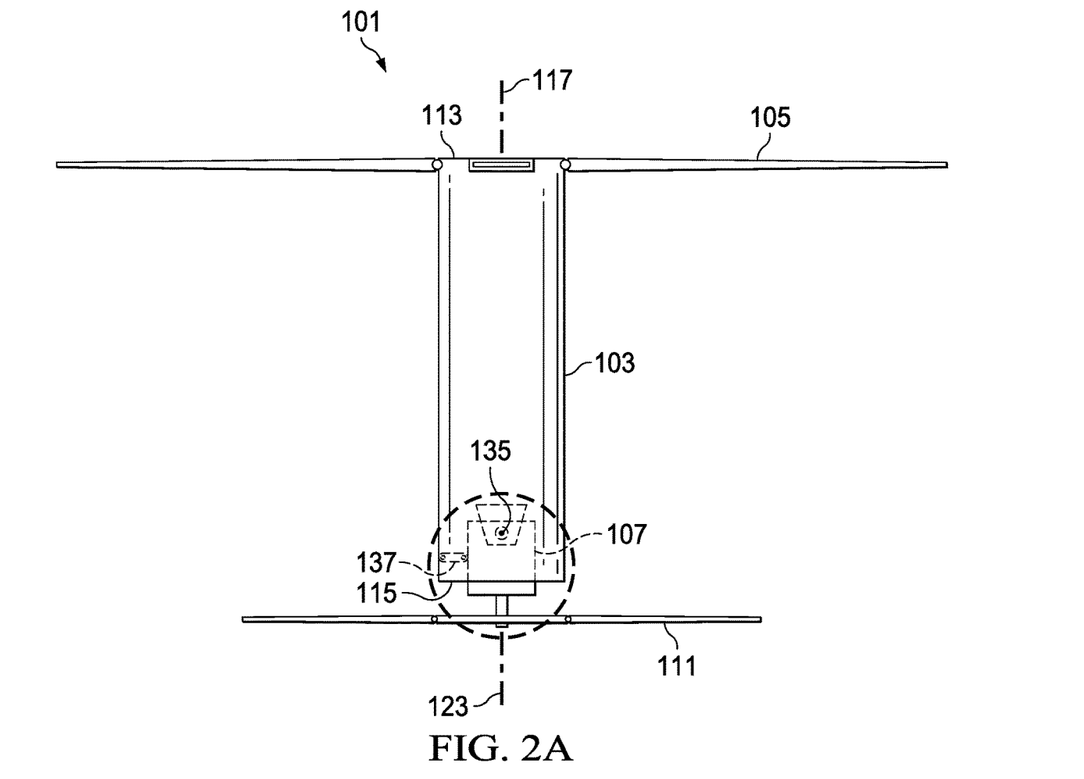
FIG. 2A is a side view of an embodiment of the unmanned rotorcraft depicted in FIG. 1 according to this disclosure, with the propulsion unit in a rest position.
Figure 2B:
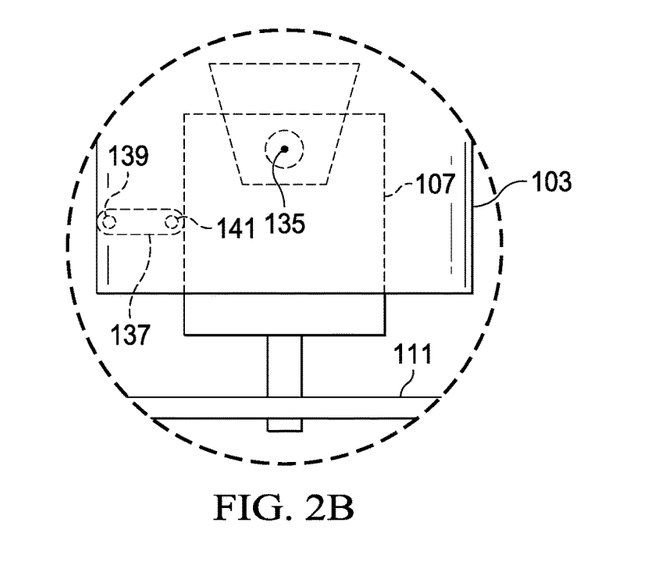
FIG. 2B is a magnified portion of the view depicted in FIG. 2A.

FIGS. 2A-2D are side views of rotorcraft 101. When propeller axis 123 is coaxially aligned with rotor axis 117, as shown in FIGS. 2A and 2B, with propeller 109 rotating, rotorcraft 101 will hover. When hovering, rotorcraft 101 can ascend, descend, or maintain altitude based on rotational speed of blades 111, which in turn determines rotational speed of blades 105. Rotational speed of propeller 109 can be regulated, for example, by an amount of power supplied to propulsion unit 107.

To enable directional maneuvering, rotorcraft 101 is adapted such that propeller axis 123 can be temporarily moved out of alignment with rotor axis 117. For example, propulsion unit 107 can be coupled to airframe 103 such that it is pivotable in one or more directions relative to airframe 103.

In this embodiment, propulsion unit 107 is coupled to airframe 103 such that it is pivotable about a pivot axis 135. As shown in FIGS. 2A and 2B, pivot axis 135 extends out of the page along a perpendicular direction. Rotorcraft 101 further includes an actuator 137 that is adapted to cause propulsion unit 107 to pivot about pivot axis 135. As shown, actuator 137 includes a first end 139 that is coupled to airframe 103 and a second opposed end 141 that is coupled to propulsion unit 107. Preferably, actuator 137 comprises a solenoid-type actuator or linear actuator that is adapted to abruptly switch between two states.

Figure 2C:
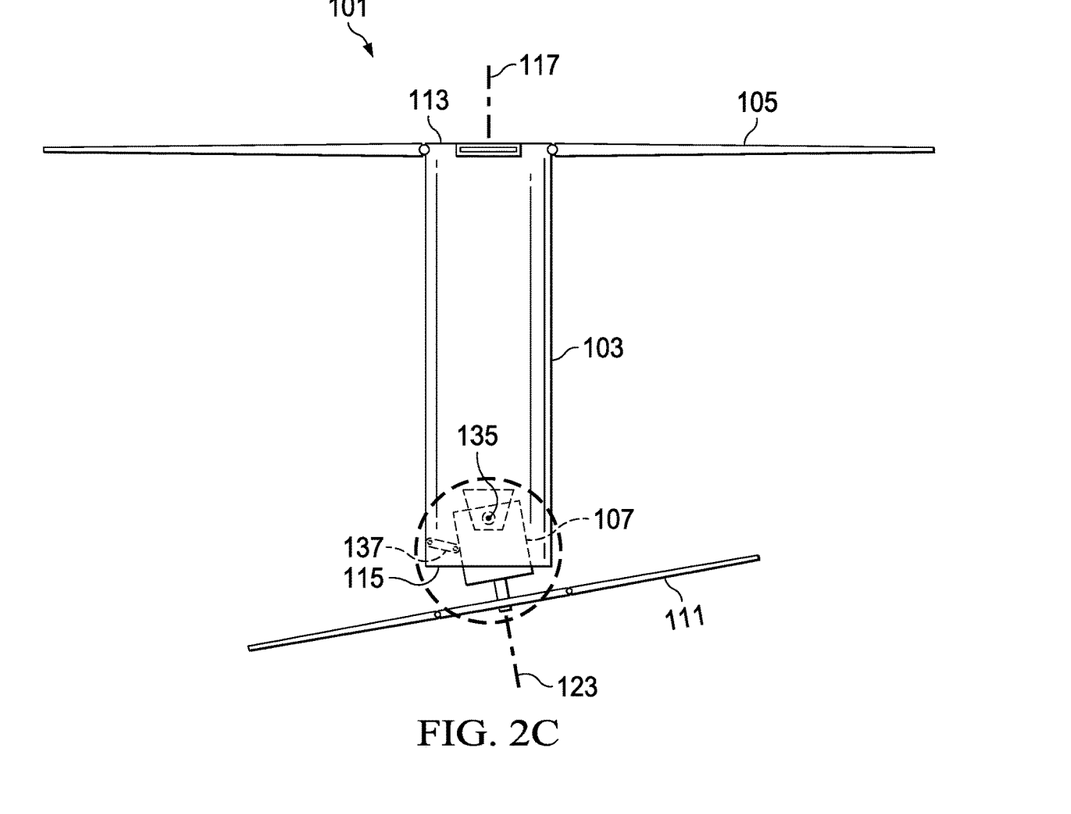
FIG. 2C is a side view of the unmanned rotorcraft depicted in FIG. 2A, with the propulsion unit reoriented such that a propeller axis of the propulsion unit is not aligned with a rotor axis of the main rotor blades.
Figure 2D:
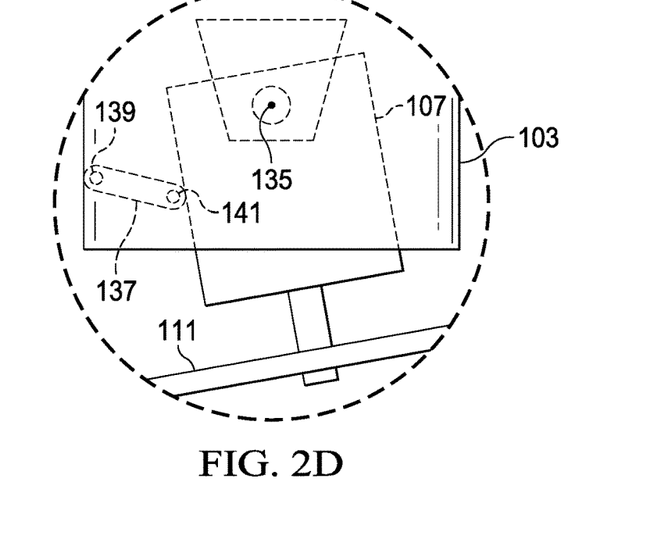
FIG. 2D is a magnified portion of the view depicted in FIG. 2C.

When activated, actuator 137 causes propulsion unit 107 to be pivoted out of a rest position (as shown in FIGS. 2A and 2B) and into a pivoted position (as shown in FIGS. 2C and 2D), thereby reorienting propulsion unit 107 such that propeller axis 123 moves out of alignment with rotor axis 117. Misalignment of propeller axis 123 relative to rotor axis 117 causes adjustment of a thrust vector applied to rotorcraft 101 by propeller 109, thereby causing a direction change in a flight path of rotorcraft 101. Actuator 137 is further adapted to leave propulsion unit 107 in the pivoted position for a short interval of time. Preferably, actuator 137 is adapted to, upon completing reorientation of propulsion unit 107 to the pivoted position, abruptly return propulsion unit 107 to the rest position such that propeller axis 123 is realigned with rotor axis 117. In this regard, actuator 137 is adapted to temporarily reorient propulsion unit 107 such that propeller axis 123 moves out of alignment with rotor axis 117.

In this embodiment, propulsion unit 107 is coupled to airframe 103 such that it is only pivotable about pivot axis 135 along a single path, from the rest position to the pivoted position and back to the rest position as shown in FIGS. 2A-2D. It should be appreciated that coupling of propulsion unit 107 to airframe 103 is not limited to the illustrated implementation in which propulsion unit 107 is only pivotable along a single path. For example, in alternative embodiments of propulsion unit 107 may be differently coupled to airframe 103, for example using discrete gimbal axes, such that it can be moved from the rest position along one or additional paths to corresponding pivoted positions.

Rotorcraft 101 further includes a control system (not shown). The control system preferably is adapted to determine a flight path between a current location of rotorcraft 101 and a target destination for rotorcraft 101 and to ensure that rotorcraft 101 remains true to the flight path while it flies to the target destination. The control system is further adapted to perform other functions related to operation of rotorcraft 101, for example starting rotation of propeller 109 such that blades 105 and blades 111 deploy upon determining that rotorcraft 101 has been deployed for flight, and causing the execution of one or more non-flight-related operations when rotorcraft 101 reaches the target destination.

The control system includes one or more navigation components. For example, navigation components may include one or more of a Global Positioning System (GPS) receiver, a magnetometer, one or more accelerometers, an inertial measurement unit (IMU), an attitude and heading reference system (AHRS), a rate gyro, and a barometric altitude sensor. The navigation components are adapted to determine a current location in space of rotorcraft 101 and to track an angular position of airframe 103. Based on information output by the navigation components, the control system causes actuator 137 to reorient propulsion unit 107 at appropriate times to keep rotorcraft 101 on course relative to its determined flight path. The control system further includes a communication component that includes an antenna, a memory for storing instructions and data, and a processor.

The processor is adapted to autonomously control flight of rotorcraft 101, for example by monitoring and governing interactions between itself and other components of the control system, such as information output by the navigation components and signals or data received by the communication component, for example. The control system is preferably implemented on one or more integrated chips and/or circuit boards.

The control system is adapted to perform a plurality of functions related to operation of rotorcraft 101. For example, the control system is adapted to receive information corresponding to a target location that rotorcraft 101 is to fly to, for example via the communication component. The control system is further adapted to, based on information provided by the navigation components, determine a current location of rotorcraft 101, determine a flight path from the current location to the target destination when flight of rotorcraft 101 is initiated, and monitor a current heading of rotorcraft 101 during flight. The control system is further adapted to track a rotational angular orientation of airframe 103, for example via one or more of the navigation components.

The control system is further adapted to, based upon a determination of whether the current heading corresponds to the determined flight path, and in accordance with the rotational angular orientation of airframe 103, cause actuator 137 to reorient propulsion unit 107 as needed to adjust the current heading of rotorcraft 101 in accordance with the determined flight path.

Rotorcraft 101 further includes a power source (not shown), such as one or more batteries. The power source is adapted to provide power to one or more of the control system, propulsion unit 107, and actuator 137.

One or more components of rotorcraft 101, such as airframe 103, blades 105, and propeller 109 can be manufactured from a composite material or any other suitable material. Preferably, composite material comprises a fiberreinforced polymer (FRP) composition that includes filament fibers, such as carbon or glass fibers for example, embedded in a thermoset polymer matrix material such as a thermoplastic resin. The components of rotorcraft 101 may alternatively be made of any other suitable material.

Figure 3:
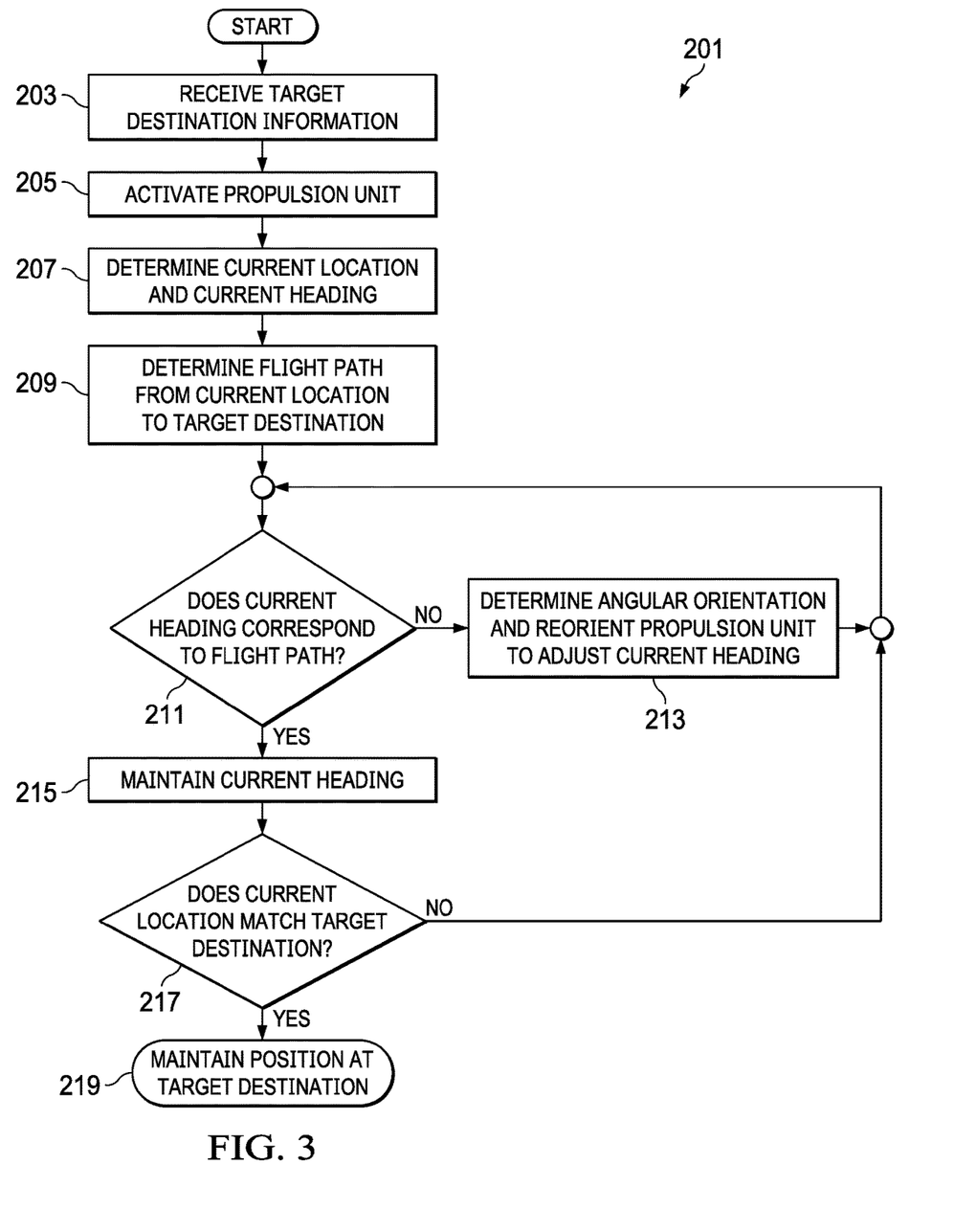
FIG. 3 is a flow chart illustrating a process for use by the unmanned rotorcraft to determine and maintain a flight path, according to this disclosure.

FIG. 3 is a flowchart illustrating a method 201 for use by rotorcraft 101 to determine and autonomously maintain a flight path toward a target destination, in accordance with this disclosure. Preferably, method 201 is embodied in computer-executable instructions that are stored in the memory of the control system and that are executed by the processor of the control system.

At step 203, rotorcraft 101 may receive information related to a target destination that rotorcraft 101 is to fly to. Preferably, the target destination information is received via the communication component of the control system, for example in the form of a signal transmitted using a wireless communication protocol. Such information may comprise, for example, GPS coordinates corresponding to the target destination.

At step 205, propulsion unit 107 is activated. Activation of propulsion unit 107 may be caused by the processor of the control system, and preferably includes causing propeller 109 to begin rotating at a speed that causes blades 105 and blades 111 to deploy, and that causes airframe 103 to rotate such that sufficient lift is generated by blades 105 to initiate flight of rotorcraft 101. Preferably, activation of propulsion unit 107 is in response to the control system detecting that initiating flight of rotorcraft 101 is desired. In this embodiment, rotorcraft 101 is adapted to be hand-deployed by a user, for example by tossing rotorcraft 101 away from the user. The control system is preferably adapted to detect a range of such tossing motions, for example via the navigation components. Rotorcraft 101 is adapted to initiate flight along a course that follows the tossing motion. However, rotorcraft 101 may alternatively be adapted to initialize flight in a hover maneuver or in any other suitable manner.

At step 207, the control system determines a current location of rotorcraft 101 and determines a current heading of rotorcraft 101, for example based on information provided by the navigation components. At step 209, the control system determines a flight path for rotorcraft 101 from its current location to the target destination. In this embodiment, the processor executes software instructions or logic to determine the flight path, using the target destination information and the current location and current heading information provided by the navigation components. The target destination information comprises one or more coordinates, such as a GPS location for example, that corresponds to the target destination.

At step 211, the control system determines whether the current heading of rotorcraft 101 corresponds to the determined flight path to the target destination. The control system is further adapted to, when the current heading of rotorcraft 101 does not correspond to the flight path to the target destination, proceed to step 213.

At step 213, the control system causes propulsion unit 107 to be reoriented one or more times to cause the current heading to be adjusted to correspond to the determined flight path. Causing propulsion unit 107 to be reoriented includes the control system determining a current angular orientation of airframe 103, and in particular of actuator 137, relative to the current heading, for example based on information provided by one or more of the navigation components that is adapted to track the angular orientation of airframe 103.

Figure 4A:
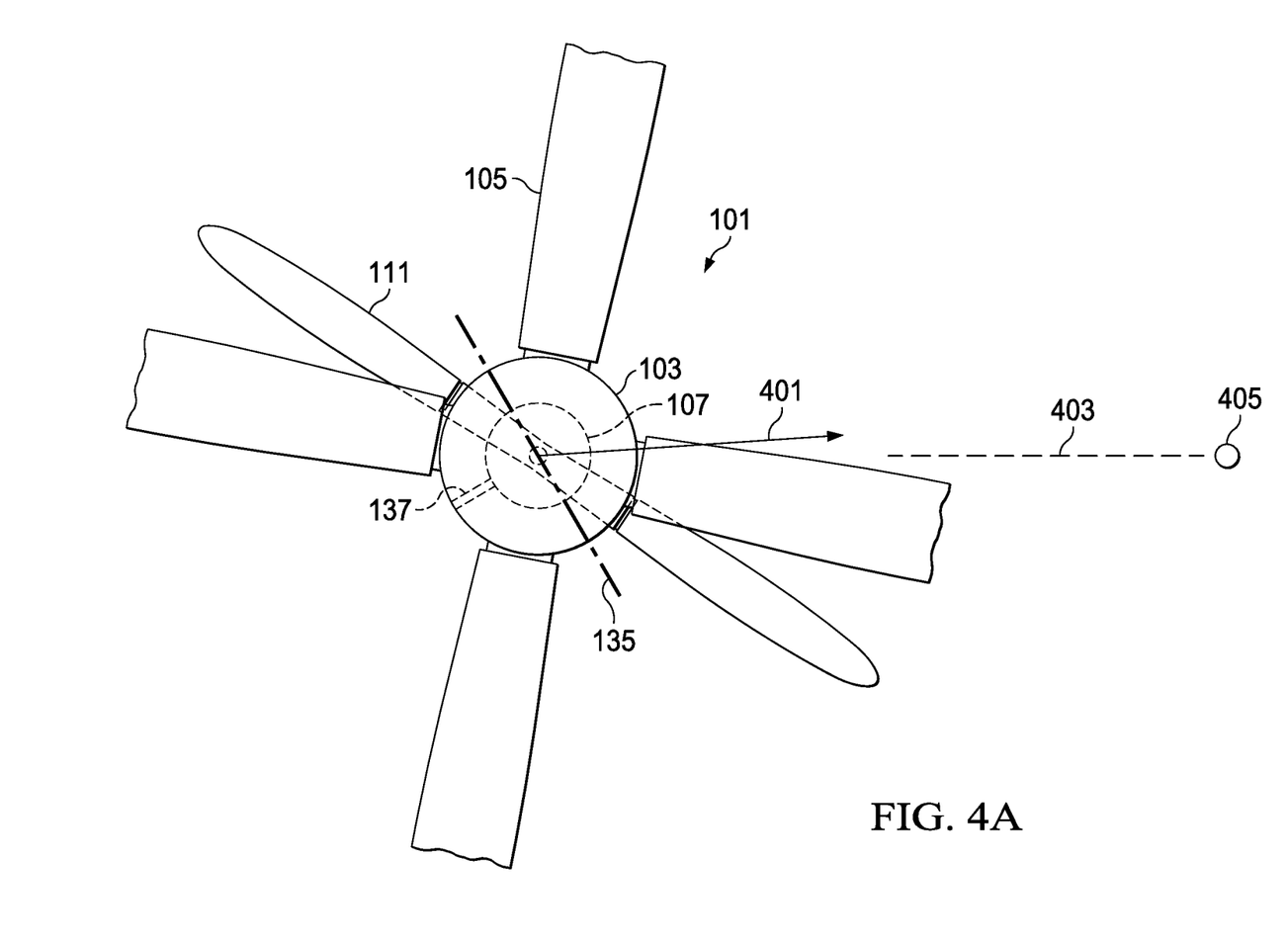
FIGS. 4A-4C are top views of the unmanned rotorcraft depicted in FIG. 1, illustrating reorientation of the propulsion unit to adjust a heading of the rotorcraft.
Figure 4B:
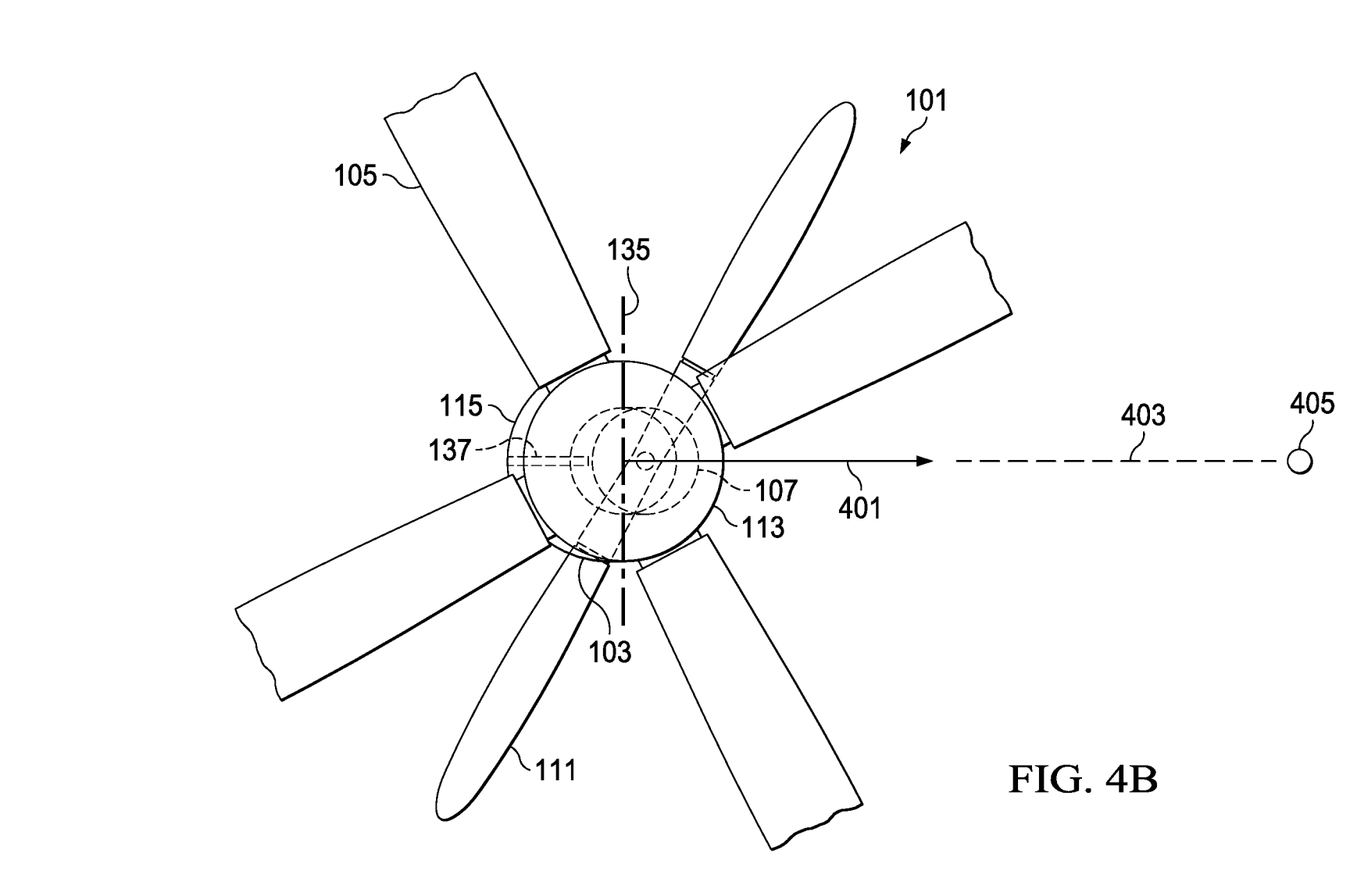
Figure 4C:
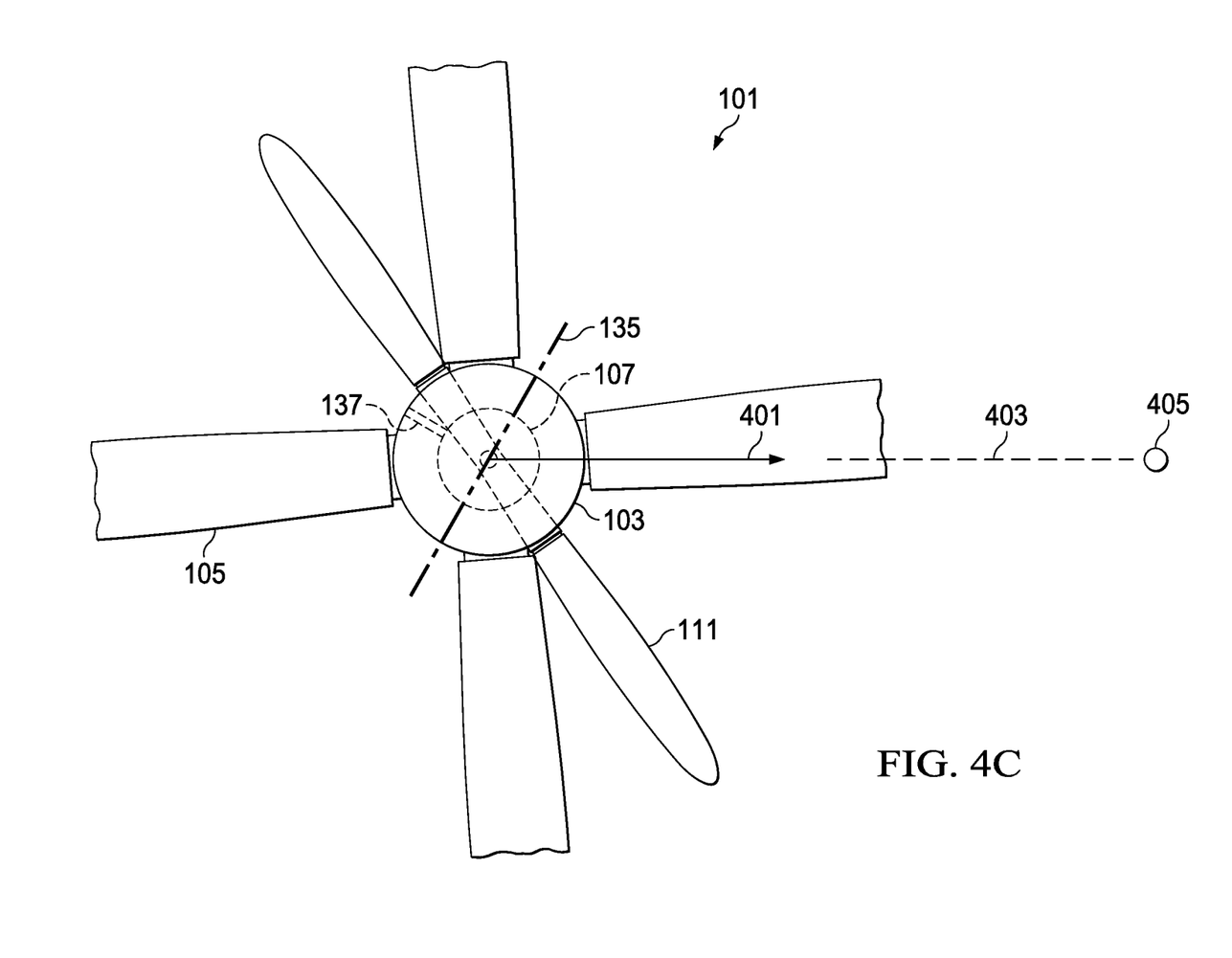

FIGS. 4A-4C are top views of the rotorcraft 101, illustrating an example reorientation of propulsion unit 107 to adjust a current heading 401 of rotorcraft 101 to correspond to a determined flight path 403 to a target destination 405. Further at step 213, based on a current rotational speed of airframe 103 and an amount of time that actuator 137 requires to cycle, that is to reorient propulsion unit 107 from the rest position to the reoriented position and back to the rest position, the control system determines an angular orientation of actuator 137 at which to trigger the reorientation of propulsion unit 107 such that current heading 401 of rotorcraft 101 will be adjusted toward determined flight path 403.

To illustrate, as seen in FIG. 4A the control system triggers the reorientation of propulsion unit 107 when actuator 137 is at a first angular orientation relative to flight path 403. In response, actuator 137 initiates a cycle and begins pivoting propulsion unit 107 about pivot axis 135. As seen in FIG. 4B, actuator 137 is fully extended such that propulsion unit 107 is in the reoriented position. With propulsion unit 107 in the reoriented position, propeller axis 123 is out of alignment with rotor axis 117, for example as seen in FIG. 2C. The misalignment between propeller axis 123 and rotor axis 117 causes airframe 103, and thus a blade plane of rotation defined by blades 105, to tilt toward target destination 405 as seen in FIG. 4B, thereby adjusting current heading 401 toward flight path 403. As seen in FIG. 4C, actuator 137 finishes its cycle, with propulsion unit 107 returned to its rest position. Method 201 then returns to step 211.

It should be appreciated that the positions of actuator 137 depicted in FIGS. 4A-4C are for illustrative purposes, and that actuator 137 may not cycle completely within a single revolution of airframe 103. For example, in operation one or more revolutions, such as three to four revolutions, of airframe 103 may occur in the time required for actuator 137 to complete a cycle of reorienting propulsion unit 107. It should further be appreciated that the control system may further be adapted to account for one or more additional factors in determining the angular orientation of actuator 137 at which to trigger the reorientation of propulsion unit 107, such as flapping characteristics of one or both of blades 105 and blades 111, for example.

Alternatively, at step 211, the control system is further adapted to, when the current heading of rotorcraft 101 corresponds to the flight path, proceed to step 215. At step 215, the control system causes rotorcraft 101 to maintain its current heading.

At step 217, the control system determines whether the current location of rotorcraft 101 matches the target destination. The control system is adapted to, when the determination indicates that the current location of rotorcraft 101 matches the target destination, proceed to step 219. At step 219, the control system causes rotorcraft 101 to maintain its position at the target destination, for example by causing rotorcraft 101 to hover in place. Alternatively, at step 217, the control system is further adapted to, when the determination indicates that the current location of rotorcraft 101 does not match the target destination, return to step 211.

It should be appreciated that performance of method 201 is not strictly limited to the framework of steps as illustrated and described herein. For example, the steps of method 201 need not be performed in the enumerated order, and one or more steps of method 201 may be modified or omitted altogether as appropriate. To illustrate, the control system is not limited to receiving the target destination information prior to activation of propulsion unit 107. Stated differently, step 203 may alternatively be performed after step 205. To further illustrate, in accordance with alternative embodiments of method 201, one or more steps of method 201 can be modified or omitted. For example, in an example alternative embodiment, a flight path to the target destination can be pre-determined, for example by a user of rotorcraft 101, and communicated to the control system, for example as part of communication of the target destination information at step 203. In such an alternative embodiment, step 209 is omitted from method 201. It should further be appreciated that method 201 is not limited to being performed by embodiments of rotorcraft 101. For example, a portion or the entirety of method 201 can be adapted for performance by rotorcraft having configurations, features, etc. that differ from those of rotorcraft 101.

It should further still be appreciated that rotorcraft 101 is not limited to collapsible rotor blades 105 and collapsible propeller blades 111 as illustrated and described herein. For example, rotorcraft 101 may be provided with blades that are alternatively configured for collapsibility, or alternatively still may be provided with blades that are permanently deployed. It should further be appreciated that rotorcraft 101 is not limited to having four blades 105 as shown, and that rotorcraft 101 can alternatively be configured with more or fewer blades 105. Furthermore, rotorcraft 101 is not limited to having two blades 111 as shown, and rotorcraft 101 can alternatively be configured with more blades 111. It should further still be appreciated that blades 105 and blades 111 are not limited to the respective illustrated geometries. For example, as shown blades 105 are longer than blades 111. However, rotorcraft 101 can be alternatively configured with blades 111 that are the same length as, or are longer than, blades 105.

Rotorcraft 101 can be provided in varying sizes, but preferably is implemented in a handheld-size scale that enables ease of transport and deployment by a user. Rotorcraft 101 can be manufactured economically, which makes it suitable for use in roles where recovery cannot be guaranteed. Rotorcraft 101 is suitable for implementation in varying roles, for example as a deployable surveillance drone capable of capturing 360° video (e.g., using a camera), as a node in a mobile communications network (e.g., a cell repeater), as a mapping drone (e.g., using lidar, photogrammetry, etc.), or as a vehicle for precise aerial delivery of an explosive (e.g., in a dangerous environment). It should be appreciated that rotorcraft 101 can be alternatively adapted to be deployed other than by hand. For example, rotorcraft 101 can be alternatively adapted to be launched, or can be alternatively adapted to be dispensed as a sub-munition.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An unmanned rotorcraft comprising:
an airframe;
a plurality of rotor blades that are coupled to the airframe in a fixed angular array about a rotor axis relative to the airframe for rotation therewith about the rotor axis;
a single propulsion unit that is coupled to the airframe, the propulsion unit including a motor and a propeller that rotates about a propeller axis; and
an actuator that is adapted to temporarily reorient the propulsion unit such that the propeller axis moves out of alignment with the rotor axis,
wherein rotation of the propeller by the propulsion unit causes counter-rotation of the airframe and rotor blades; and
wherein the motor is carried within the airframe and axially between the rotor blades and the propeller.

2. The rotorcraft of claim 1, wherein the rotor blades are collapsible toward the airframe when the rotorcraft is not in flight.

3. The rotorcraft of claim 1, wherein the rotor blades are adapted to deploy from respective collapsed positions when flight of the rotorcraft is initiated.

4. The rotorcraft of claim 1, wherein the rotor blades and the propulsion unit are located at opposed ends of the airframe.

5. The rotorcraft of claim 1, further comprising:
a navigation component,
wherein the navigation component causes the actuator to reorient the propulsion unit to maintain a flight path of the rotorcraft.

6. The rotorcraft of claim 1, wherein the actuator is further adapted to, upon completing reorientation of the propulsion unit, return the propulsion unit to a rest position wherein the propeller axis is aligned with the rotor axis.

7. The rotorcraft of claim 1, wherein the propeller has propeller blades that are collapsible relative to the airframe when the rotorcraft is not in flight.

8. The rotorcraft of claim 7, wherein the rotor blades and propeller blades are adapted to deploy from respective collapsed positions when flight of the rotorcraft is initiated.

9. The rotorcraft of claim 1, wherein the propulsion unit is coupled to the airframe such that the propulsion unit is pivotable about a pivot axis by the actuator.

10. The rotorcraft of claim 9, wherein the propulsion unit is only pivotable about the pivot axis along a single path from a rest position in which the propeller axis is coaxial with the rotor axis.

11. A method of operation executed by an unmanned rotorcraft, the method comprising:
receiving a target destination for the rotorcraft;
activating a single propulsion unit coupled to an airframe of the rotorcraft;
determining a current location and a current heading of the rotorcraft;
determining a flight path from the current location to the target destination;
determining whether the current heading corresponds to the flight path;
when the current heading corresponds to the flight path, maintaining the current heading; and
when the current heading does not correspond to the flight path, causing an actuator that is coupled to the airframe and the propulsion unit to temporarily reorient the propulsion unit in accordance with an angular orientation of the actuator relative to the current heading, thereby adjusting the current heading toward the flight path;
wherein operation of the single propulsion unit alone provides both rotation of a propeller and counter-rotation of the airframe and rotor blades.

12. The method of claim 11, wherein the actuator temporarily reorienting the propulsion unit comprises the actuator pivoting the propulsion unit such that a propeller axis thereof moves out of alignment with the rotor axis of the airframe.

13. The method of claim 11, further comprising:
recognizing a deployment of the rotorcraft,
wherein activating the propulsion unit is performed in response to the recognition of deployment.

14. The method of claim 11, further comprising:
determining whether the current location matches the target destination; and
when the current location matches the target destination, maintaining a position of the rotorcraft proximal to the target destination.

15. The method of claim 11, wherein activating the propulsion unit includes rotating a propeller of the propulsion unit such that the airframe counter-rotates relative to the propeller.

16. The method of claim 15, wherein activating the propulsion unit includes rotating the propeller such that counter-rotation of the airframe causes deployment of collapsed rotor blades coupled to the airframe for rotation therewith.

17. The method of claim 15, wherein activating the propulsion unit includes causing deployment of collapsed propeller blades of the propeller.

* * * * *